United States Patent [19]

Sakamoto et al.

[11] Patent Number: 4,627,742

[45] Date of Patent: Dec. 9, 1986

[54] COMPUTER CONTROLLED ELECTRONIC THERMOMETER

[75] Inventors: Tamaki Sakamoto, Kyoto; Sakamoto Yoshihisa, Shiga, both of Japan

[73] Assignee: Omron Tateisi Electronics Co., Kyoto, Japan

[21] Appl. No.: 709,750

[22] Filed: Mar. 8, 1985

[30] Foreign Application Priority Data

Mar. 8, 1984 [JP] Japan ............................. 59-33888

[51] Int. Cl.⁴ .......................... G01K 1/02; G01K 3/00
[52] U.S. Cl. ................................... 374/109; 364/557; 374/167; 374/170
[58] Field of Search ............... 374/170, 110, 109, 167; 340/691; 364/557

[56] References Cited

U.S. PATENT DOCUMENTS

| | | | |
|---|---|---|---|
| 4,206,649 | 6/1980 | Nagaie | 374/110 X |
| 4,298,947 | 11/1981 | Tamura et al. | 374/170 X |
| 4,403,296 | 9/1983 | Prosky | 374/109 X |
| 4,406,550 | 9/1983 | Gray | 374/110 |
| 4,442,424 | 4/1984 | Shirasaki et al. | 340/691 |
| 4,446,913 | 5/1984 | Krocker | 374/109 X |
| 4,480,312 | 10/1984 | Wingate | 374/170 X |

Primary Examiner—Daniel M. Yasich

[57] ABSTRACT

Disclosed is an electronic thermometer which comprises a first and a second sensing portions for detecting temperature at different two positions and each producing an output corresponding to the detected temperature; a display for displaying a temperature in a mode selected from a first mode in which the temperature detected by the first temperature sensing portion is continuously displayed, a second mode in which the temperature detected by the second temperature sensing portion is continuously displayed, and a third mode in which the temperatures respectively detected by the first and second temperature sensing portions are alternately displayed; and a selector for selectively connecting the respective outputs of the first and second temperature sensing portions to the display; and a controller for selecting the display mode of the display.

3 Claims, 2 Drawing Figures

COMPUTER CONTROLLED ELECTRONIC THERMOMETER

BACKGROUND OF THE INVENTION

1. Field of the Invention

The present invention relates to an electronic thermometer provided with two temperature sensing portions for measuring temperatures at two different positions, for example, indoor and outdoor.

2. Description of the Prior Art

Generally, it is sometimes desired to measure temperatures at the same time in different positions such as indoors and outdoors, in a room and in a constant temperature oven, or the like. In such cases, conventionally, two thermometers or two electronic thermometers have been used. Even if the temperatures at two positions can be measured, it is uneconomical to use two independent thermometers. If the temperatures in two positions can be measured by a single electronic thermometer disposed in a certain place, the comparing measurement of the temperatures in two positions becomes easier as well as economical.

SUMMARY OF THE INVENTION

In view of the description described above, an object of the present invention is to provide an electronic thermometer which can measure temperatures in two positions at the same time while comparing the temperatures with each other, or which can measure a temperature in either one of two positions, and besides which is inexpensive.

In order to attain the object, according to an aspect of the present invention, the electronic thermometer comprises a first and a second temperature sensing portions for detecting temperature at different two positions and each producing an output corresponding to the detected temperature; a display for displaying a temperature in a mode selected from a first mode in which the temperature detected by the first temperature sensing portion is continuously displayed, a second mode in which the temperature detected by the second temperature sensing portion is continuously displayed, and a third mode in which the temperatures respectively detected by the first and second temperature sensing portions are alternately displayed; and a selector for selectively connecting the respective outputs of the first and second temperature sensing portions to the display; and a controller for selecting the display mode of the display.

Preferably, the selector includes a change-over circuit for selecting one of the respective output electric signals of the first and second temperature sensing portions, and an analog-to-digital converter for converting the selected electric signal into a digital electric signal, so that the display displays the temperature represented by the digital electric signal.

Preferably, the controller includes a command input device for manually entering a command as to the selection of the display mode, and a control unit responsive to the entered command to control the selecting operation of the change-over circuit and the display mode of the display.

Other objects, features and advantages of the invention will be apparent from the following description taken in conjunction with accompanying drawings.

DETAILED DESCRIPTION OF PREFERRED EMBODIMENT

Figure 1:
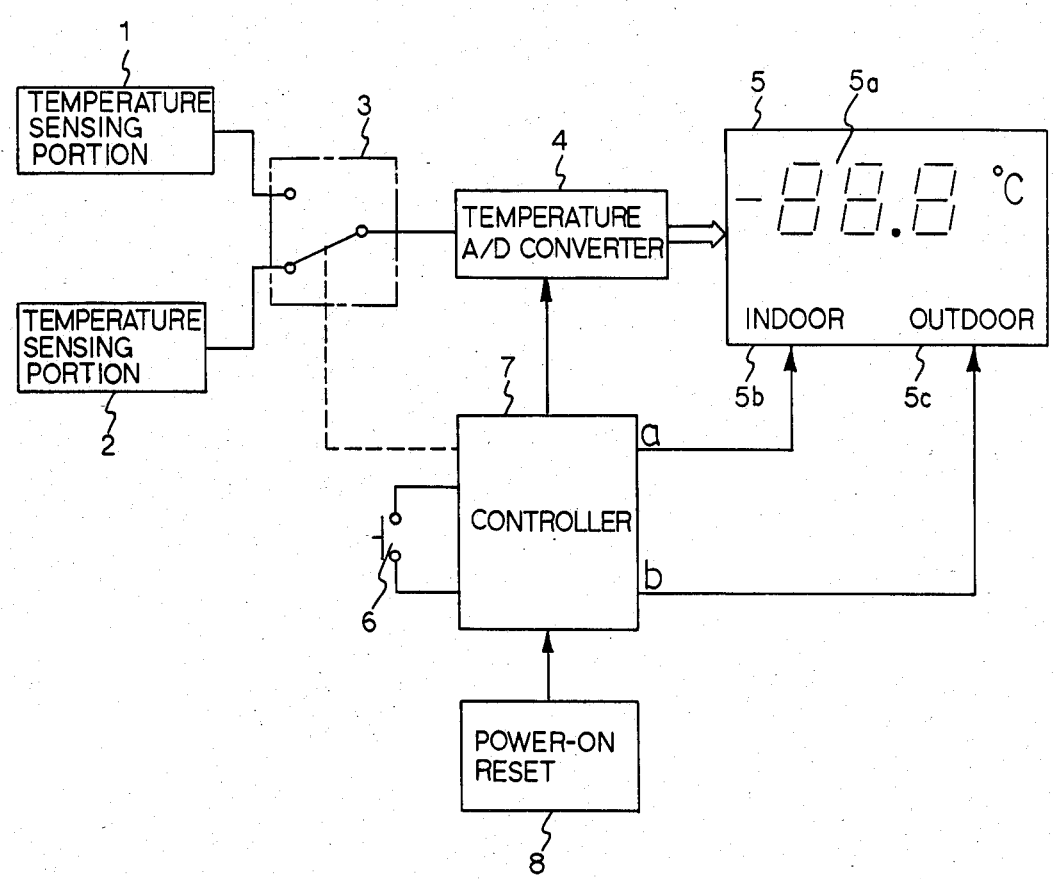
FIG. 1 is a block diagram showing an embodiment of the electronic thermometer according to the present invention.

Referring to the drawing, an embodiment of the present invention will be described hereunder.

FIG. 1 is a block diagram showing an embodiment of the electronic thermometer according to the present invention. The electronic thermometer is provided with a first temperature sensing portion 1 for indoor use and a second temperature sensing portion 2 for outdoor use, in order to measure an indoor and an outdoor temperatures, respectively. Each of these temperature sensing portions 1 and 2 converts a detected temperature into an electric signal, and any one of the respective outputs of the first and second temperature sensing portions 1 and 2 is selected by a change-over circuit 3 and applied to a temperature analog-to-digital (hereinafter A/D) converter portion 4.

The temperature A/D converter portion 4 converts an applied analog electric signal, that is, a temperature signal, into a digital signal and applies the digital signal to a display 5 which is arranged to digitally display the temperature at a temperature display portion 5a. The display 5 is further provided with display portions for an indoor mark display 5b labeled "INDOOR" and an outdoor mark display 5c labeled "OUTDOOR".

There is provided a button switch 6 for selecting the display mode (hereinafter simply referred to as a switch), and whenever the switch 6 is operated, the change-over circuit 3 is switched under the control by a control portion 7 so as to suitably selectively produce a signal a for turning on the indoor mark display 5b and a signal b turning on the outdoor mark display 5c. That is, the display mode of the display 5 is successively changed in the order of a continuous display of an indoor temperature, a continuous display of an outdoor temperature, and an alternating display of an indoor and an outdoor temperature, in response to the operation of the switch 6, so that a desired one of the three display modes may be freely selected.

A CPU is used for the control portion 7 in which memory means as well as timer means required for calculating are incorporated. A power-on reset portion 8 is connected to the control portion 7.

Figure 2:
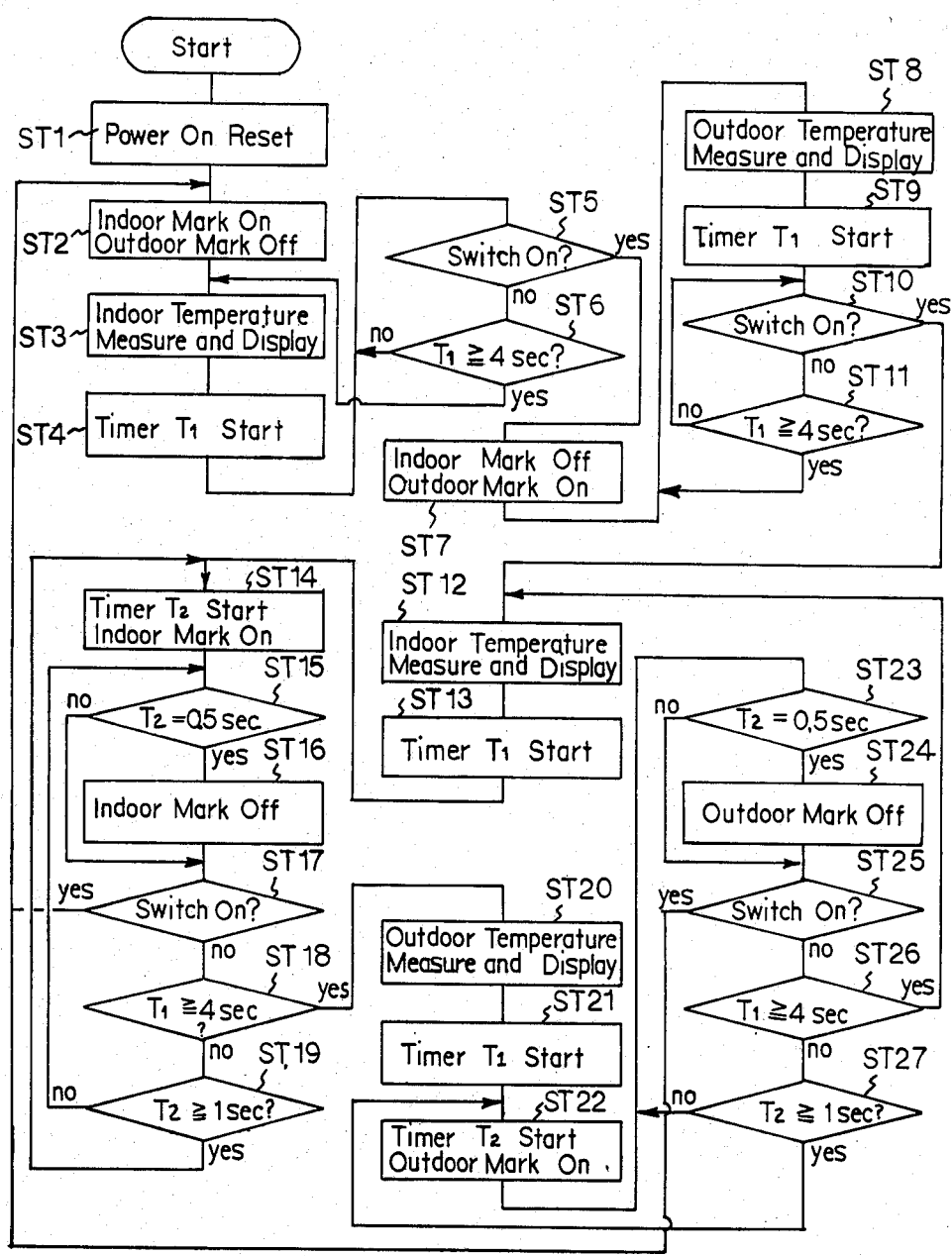
FIG. 2 is a flowchart for explaining the operation of the electronic thermometer.

Referring to a flowchart shown in FIG. 2, the operation of the embodiment of the electronic thermometer will be described.

If an electric source is turned on to start the operation, the power-on reset portion 8 is actuated in the step (hereinafter abbreviated as ST) 1, and the indoor mark and outdoor mark displays 5b and 5c are turned off and on respectively (ST 2). Succeedingly, an indoor temperature is measured and the measured temperature is displayed on the temperature display portion 5a of the display 5 (ST3). In that time, the change-over circuit 3 is switched under the control by the control portion 7 so as to connect the temperature sensing portion 1 to the temperature A/D converter portion 4. The temperature detected in the temperature sensing portion 1 is converted into an analog electric signal thereat, and then further converted into a digital electric signal in the temperature A/D converter portion 4. The thus converted digital electric signal representing the temperature is applied to the display 5. The digital electric signal applied to the display 5 is displayed at the temperature display portion 5a.

Next, a timer T1 (not-shown) incorporated in the control portion 7 starts and a judgement is made as to whether the switch 6 has been turned on or not (ST 5). If the switch 6 has not been yet turned on, a succeeding judgement is made as to whether the count value of the timer 1 has reached 4 seconds or not (ST 6). In the case in which the count value of the timer 1 has not reached 4 seconds and the switch 6 has not been turned on, an answer "NO" is given as the result of judgement as to each of the questions "switch on ?" and "T1≧4 sec. ?" in the STs 5 and 6 respectively, and the respective judgements in the STs 5 and 6 are repeated. During these judgements, the temperature detected in the temperature sensing portion 1 is displayed at the temperature display portion 5a, and the indoor mark display 5b is kept in the on-state.

If the switch 6 has not been yet turned on after a lapse of 4 seconds from the starting of the timer T1, the judgement in the ST 6 gives an answer "YES" and the operation is returned to the ST 3 to measure and display the indoor temperature again. Then, the timer T1 is actuated to start again (ST 4). After the start of the timer T1, the respective judgements in the STs 5 and 6 are repeated in the same way as described above so long as the switch 6 is kept in the off-state.

Thus, under the conditions that the power source is in the on-state while the switch 6 is in the off-state, the temperature detected in the temperature sensing portion 1, that is, the indoor temperature, is renewed every 4 seconds and displayed continuously.

If it is intended to display continuous only the outdoor temperature, that is, temperature detected in the temperature sensing portion 2, the operator turn on the switch 6 once. As the result, the judgement in the ST 6 provides an answer "YES", and the operation is shifted to the ST 7 so that the indoor mark display 5b is turned off and the outdoor mark display 5c is turned on. The outdoor temperature is measured in the temperature sensing portion 2, and the change-over circuit 3 is switched under the control by the control portion 7 such that the measured outdoor temperature is applied to the display 5 from the temperature sensing portion 2 through the change-over circuit 3 and the temperature A/D converter portion 4 so as to be displayed at the temperature display portion 5a (ST 8). Succeedingly, the timer T1 starts (ST9), the respective judgements are made as to "switch on ?" (ST 10) and "T1≧4 sec. ?" (ST 11), respectively. Unless the switch 6 is turned on further, the operations in the STs 8 to 11 are repeated every 4 seconds. That is, every 4 seconds, the outdoor temperature is sampled, renewed and displayed continuously. The operations in the STs 8 to 11 are the same as those in the ST 3 to 6 in the case of the indoor temperature display.

When the indoor and outdoor temperatures are to be displayed alternately, the operator turns on the switch 6 once more in the state in which the outdoor temperature is displayed continuously, that is, in the state in which the outdoor mark display 5c is turned on.

As the result, the judgement as to the question "switch on ?" in the ST 10 provides an answer "YES", and the change-over circuit 3 is switched such that the indoor temperature is measured and displayed at the temperature display 5a. At that time, the timer T1 is started (ST 13), a not-shown timer T2 incorporated in the control portion 7 is also started, and the indoor mark display 5b is turned on (ST 14).

Succeedingly, a judgement is made as to whether the count value of the timer T2 has reached 0.5 seconds (ST 15) or not. If the count value of the timer T2 has reached 0.5 seconds, the judgement provides an answer "YES", and the operation is shifted to the ST 16 in which the indoor mark display 5b is turned off. If the count value has not reached 0.5 seconds yet, on the contrary, the judgement in the ST 15 provides an answer "NO", and the operation is shifted to the ST 17 by skipping over the ST 16. In the ST 17, the judgement is made as to "switch on ?". If the switch 6 has not been turned on, the judgement results in an answer "NO", and the succeeding judgement is made as to "T1≧4 sec. ?" (ST 18). If the count value of the timer T1 has not reached 4 seconds, the judgement provides an answer "NO" and the operation is shifted to the ST 19 in which a judgement is made as to "T2≧1 sec. ?", that is, as to whether the count value of the timer 2 has reached 1 second or not. When the count value of the timer T2 has not reached 1 second yet, the operation is returned to the ST 15 and the operation in the STs 15 to ST 19 are repeated till the count value of the timer T2 amounts to 1 second.

After the lapse of time of 1 second from the start of the timer T2, the answer of the judgement as to "T2≧1 sec. ?" in ST the 19 becomes "YES", and the operation is returned to the ST 14, the timer 2 is started again and at the same time the indoor mark display 5b is turned on. The operation in the STs 15 to 19 are repeated till 1 second has elapsed again. Further, the operations in the STs 14 to 19 are repeated till 4 seconds have elapsed after the timer T1 is started. During these operations, the indoor temperature is displayed at the temperature display portion 5a and the indoor mark display 5b is turned on/off alternately every 0.5 seconds.

When 4 seconds have elapsed from the start of the timer T1 in the ST 13, the judgement as "T1≧4 sec. ?" in the ST 18 becomes "YES", and the operation is shifted to the step ST 20 in which the change-over circuit 3 is switched so that the outdoor temperature is measured and displayed at the temperature display portion 5a. Then the timer T1 is started (ST 21), and the timer T2 is also started and at the same time the outdoor mark display 5C is turned on (ST 22). Next, the judgement is made as to "T2≧0.5 sec. ?" (ST 23), and when 0.5 seconds has elapsed after the start of the timer T2 the outdoor mark display 5c is turned off in the ST 24, while if 0.5 seconds has not yet elapsed the operation is caused to skip over the ST 24. The judgements as to "switch on ?", "T1≧4 sec. ?", and "T2≧1 sec. ?" are made in the STs 25, 26, and 27 respectively. Accordingly, the operations in the STs 21 to 27 after the measurement and display of the outdoor temperature in the ST 20 correspond to those in the STs 13 to 19 after the measurement and display of the indoor temperature in the ST 12, and unless the switch 6 is turned on next, the judgement in the ST 25 provides "NO", so that the outdoor temperature is displayed on the temperature display portion 5a and the outdoor mark display 5c is turned on/off alternately every 0.5 seconds till 4 seconds have elapsed after the start of the timer T1.

If 4 seconds have elapsed after the start of the timer T1 in the ST 21, the judgement made in the ST 26 as to "T1≧4 sec. ?" produces an answer "YES" so that the operation is caused to return to the ST 12 and the indoor temperature is displayed for next 4 seconds. Thus, unless the switch 6 is turned on, the operations in the STs 12 to ST 19 and those in the STs 20 to ST 27 are alternately repeated every 4 seconds, so that the indoor and outdoor temperatures are alternately displayed at the temperature display portion 5*a*. The distinction as to which temperature is being displayed at the temperature display portion 5*a* is made by the flashing operation of selected one of the indoor mark display 5*b* and the outdoor mark display 5*c*. The distinction between the individual display of selected one of the indoor and outdoor temperatures and the alternating display of them can be made by the continuous turning-on operation of selected one of the indoor and outdoor mark displays 5*b* and 5*c* and the flashing operation of the indoor and outdoor mark displays 5*b* and 5*c*.

If the switch 6 is turned on in displaying alternately the indoor and outdoor temperatures, the judgement in the ST 25 provides "YES" and the operation is returned to the ST 2 to continuously display the indoor temperature.

In the embodiment as described above, every time the switch 6 is turned on, the display modes can be successively selectively changed, for example, successively in the order of indoor temperature continuous display→outdoor temperature continuous display→indoor/outdoor temperature alternating display→indoor temperature continuous display→ . . .

Although only one switch is used for selecting the display mode in the above-mentioned embodiment, a plurality of switches corresponding in number to the selectable display modes may be provided.

Although the description has been made about the case where the indoor and outdoor temperatures are measured and displayed as an embodiment of the present invention, the present invention is not limited to that case but can be applied to any electronic thermometer for measuring and displaying temperatures in two places, for example, in the inside and outside of a constant temperature oven.

The electronic thermometer according to the present invention is arranged such that the continuous display of selected one of the temperatures respectively measured in two places and the alternating display of those temperatures are selectively performed, so that it is possible to easily measure temperatures in two places while comparing between the temperature, and a single display for one electronic thermometer is sufficient for the purpose of the invention so that the cost is reduced in comparison with the prior art in which two independent electronic thermometers are used for the same purpose.

What is claimed is:

1. An electronic thermometer, comprising:
   a first and a second temperature sensing means for detecting temperature at two different locations, each of which temperature sensing means produces an output corresponding to the respective detected temperature;
   a display means for displaying a temperature or temperatures in a display mode selected from a first mode in which the temperature detected by said first temperature means is continuously displayed, a second mode in which the temperature detected by said second temperature sensing means is continuously displayed, and a third mode in which the temperatures detected by said first and second temperature sensing means are alternately displayed;
   a computer-controlled control means for selectively setting the display mode of said display means, said computer-controlled control means including a command means for manually entering a command for selecting one of said display modes and a control unit responsive to the entered command for controlling the selective setting of the display mode;
   a first selection means connected to said computer-controlled control means for selecting the desired display mode to be set by said computer-controlled control means; and
   a second selection means connected to said computer-controlled control means and directly responsive thereto for selectively connected the respective desired outputs of said first and second temperature sensing means to said display means,
   said second selection means inclusing a change-over means for selecting one of the respective outputs of said first and second temperature sensing means and including output signalling means for producing an output signal to which said display means is directly responsive to display the desired display mode.

2. An electronic thermometer according to claim 1, in which said display means includes means for indicating the selected display mode.

3. An electronic thermometer according to claim 1, in which the outputs of said first and second temperature sensing means are in the form of an analog electrical signal and in which the output signalling means of the second selection means includes an analog-to-digital converter means for converting the selected output of the first or second temperature sensing means into a digital electrical signal to which the display means is directly responsive.

* * * * *